tion of the copending applica-

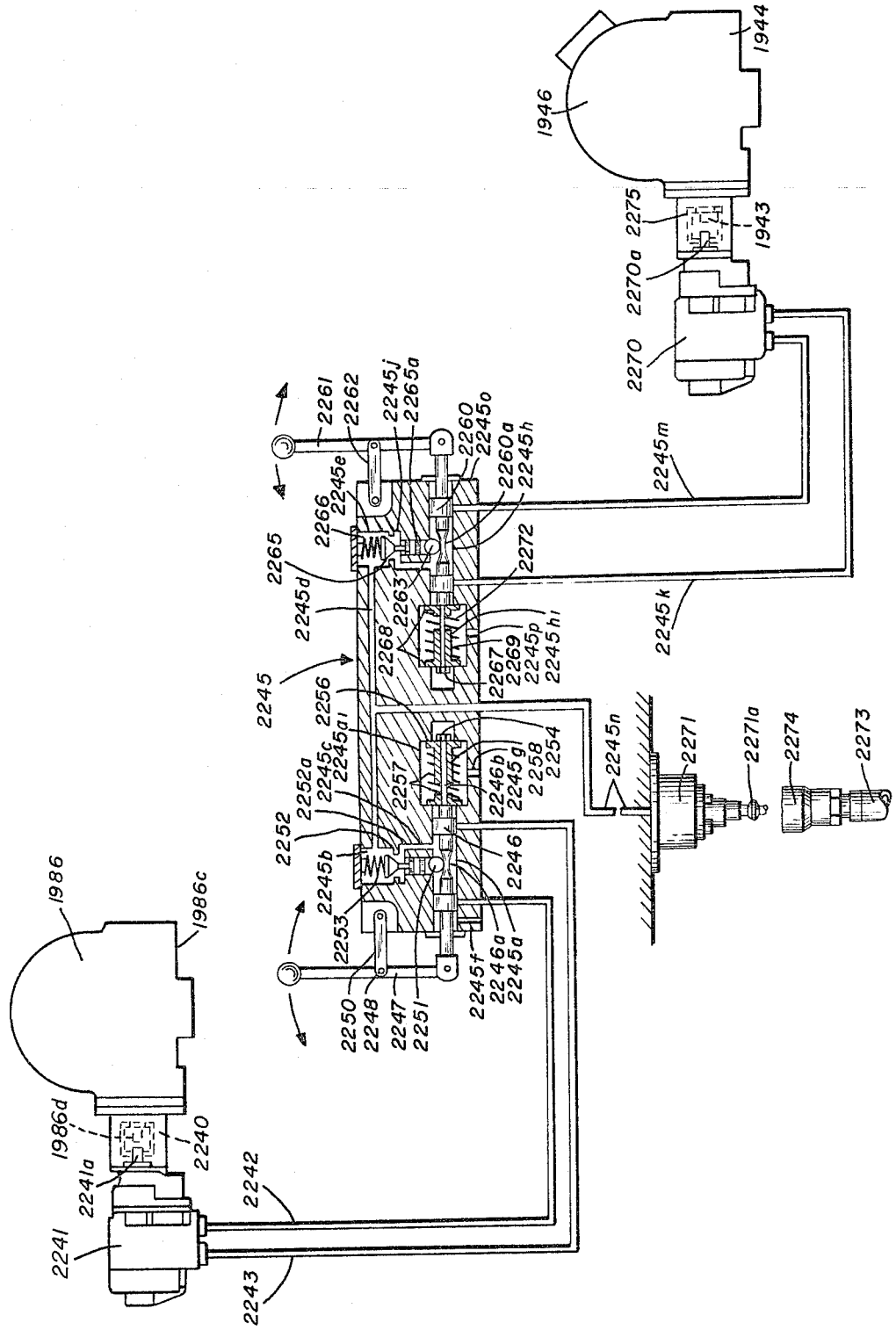

United States Patent Office 3,276,319
Patented Oct. 4, 1966

3,276,319
AIR MOTOR DRIVE FOR A MISSILE HANDLING DEVICE
Garold A. Kane, Arthur G. Blomquist, Harrison Randolph, John S. Scheurich, and Palmer G. Wermager, Minneapolis, Minn., Fred H. Allen and Robert E. Carlberg, Washington, D.C., Ferdinand J. Schiavi, Falls Church, Va., and Arthur J. Dohm, Chisago City, and Milton C. Neuman, Champlin, Minn., assignors, by direct and mesne assignments, to the United States of America as represented by the Secretary of the Navy
Original application May 5, 1955, Ser. No. 506,392, now Patent No. 3,228,293. Divided and this application Oct. 9, 1964, Ser. No. 415,557
2 Claims. (Cl. 89—1.815)

This application is a division of the copending application of Garold A. Kane et al., Serial No. 506,392, now Patent No. 3,228,293, for Apparatus for Handling Missiles.

This invention relates to a means for positioning a movable launcher of a missile handling device and, more particularly, to an air motor for driving a rotatable launcher mechanism. It is frequently required that the launcher mechanism in the missile handling device be rotatable in order to allow a missile mounted on the launcher to be directed toward a target. For such rotatable launcher mechanisms it is necessary that a suitable motor, such as an air motor, be provided for driving the launcher mechanism.

Accordingly, it is an object of this invention to provide a missile-handling device including a launcher having a power propelled member which receives a missile and is movable for positioning said missile for firing, together with means whereby said member can be moved by an additional motor such as an air motor.

This and other objects and advantages of the invention will be fully set forth in the following description made in connection with the accompanying drawing in which:

The figure is a diagrammatic and schematic view largely in section of the mechanism provided for using an air motor for moving parts of the launcher.

The elevating mechanism for the launcher can be driven manually by turning a tool applied to the worm gear shaft 1986d which projects at one end of the worm gear housing 1986c forming part of the brake housing 1986. The training gear mechanism for the launcher can be operated by turning a tool applied to the end of the worm gear shaft 1943 which projects at one end of the worm gear housing 1944. Provision is made to operate said mechanisms through said worm gear shafts by air driven motors.

Brake mechanism 1986 of the elevating gear mechanism is shown and the worm gear shaft 1986d thereof is connected by a coupling 2240 to the driving shaft 2241a of an air motor 2241. Air is delivered to motor 2241 by a conduit 2242 and passes from said motor through a conduit 2243. Conduits 2242 and 2243 communicate with a valve chamber 2245a in a valve block 2245. A valve 2246 is movable in chamber 2245a and has a portion projecting from one end of block 2245, said portion being pivoted to the end of a hand lever 2247 fulcrumed intermediate its ends on a pivot 2248 which connects said lever to a link 2250, said link being pivoted at its other end to block 2245. Valve 2246 has a reduced portion 2246a having a concave surface which is engaged by a ball 2251. Ball 2251 engages a piston 2252a connected to a check valve 2252 moved to its seat in a chamber 2245b by a coiled compression spring 2253. A passage 2245c connects chamber 2245b to chamber 2245a. A passage 2245d extends from chamber 2245b to a similar chamber 2245e adjacent the other end of block 2245.

Valve 2246 has a reduced portion 2246b forming a shoulder and said reduced portion is provided with a nut 2254 at its free end. Chamber 2245a has an enlarged portion 2245a1 through which reduced portion 2246b passes. Washers 2256 have their remote sides engaging the ends of chamber portion 2245a1 and have their adjacent sides engaged by the ends of a compression coiled spring 2257 which surrounds rod 2246b. Said remote sides are also engaged by a nut 2254 and by the shoulder formed by the reduced portion 2246b. A sleeve 2258 surrounds rod 2246b and is movable thereon, the same being of somewhat less length than the distance between the adjacent sides of washers 2256. A passage 2245f extends from adjacent one end of chamber 2245a to the atmosphere. A passage 2245g extends from the chamber enlargement 2245a1 to the atmosphere.

Block 2245 has another chamber 2245h therein identical with chamber 2245a. A valve 2260 is movable in chamber 2245h and is identical with valve 2246. A hand lever 2261 is pivoted to a link 2262 pivotally connected to block 2245 and is connected at one end to a portion of valve 2260 projecting from block 2245. Said latter parts are identical with lever 2247, link 2250 and the corresponding portion of valve 2246. Valve 2260 has a reduced portion 2260a having a concave surface engaged by a ball 2263, which ball also engages a piston portion 2265a of a check valve 2265 movable in chamber 2245e. Said parts are respectively identical with portion 2246a, ball 2251, piston 2252a, check valve 2252 and chamber 2245b already described. Valve 2265 is urged to a seat in chamber 2245e by a compression coiled spring 2266. A passage 2245j connects chamber 2245e with chamber 2245h. Chamber 2245h has an enlarged portion 2245h1 and a reduced portion 2260a of valve 2260 extends through said enlarged portion, the same having a nut 2267 at its free end. Washers 2268 have their remote sides engaging the ends of enlarged portion 2245h1. Said remote sides are engaged also by said nut 2267 and a shoulder on valve 2260 formed by reduced portion 2260a respectively. A compression coiled spring 2272 has its ends respectively engaging the remote sides of washers 2268. A sleeve 2269 surrounds reduced portion 2260a and has a length somewhat shorter than the distance between washers 2268. A conduit 2245p extends from enlarged portion 2245h1 of chamber 2245h to the atmosphere and another conduit 2245o extends from one end of chamber 2245h to the atmosphere. A conduit 2245k extends from chamber 2245h to an air motor 2270 and another conduit 2245m extends from chamber 2245h to motor 2270. Said conduits 2245m and 2245k form the inlet and outlet conduits for motor 2270. The driveshaft 2270a of motor 2270 is connected to the worm gear shaft 1943 of the brake of the training gear mechanism by a coupling 2275. The brake housing 1946 and the worm gear housing 1944 forming a part thereof are shown.

A conduit 2245n extends from passage 2245d to an air inlet member 2271. Member 2271 includes a nozzle 2271a. A conduit 2273 extends to a supply of air under 100 pounds pressure per square inch and has at its end a fitting 2274 which can be pushed over nozzle 2271a to connect conduit 2273 to conduit 2245n.

In operation, when the launcher arm is to be elevated, the operator will move lever 2247 clockwise as indicated by the right-hand arrow in the figure, and this will move valve 2246 to the left. Ball 2251 will be raised and will in turn raise check valve 2252. Air under pressure from conduit 2245n can now pass through passage 2245d into chamber 2245b, past valve 2252, through passage 2245c, into chamber 2245a and around valve 2246 into conduit 2242. Conduit 2242 extends to motor 2241 and said motor will now be operated. Air from motor 2241 will pass through conduit 2243 into chamber 2245a at the right of valve 2246, into enlarged chamber 2245a1, and out through the exhaust passage 2245g to the atmosphere. Motor 2241 will drive shaft 1986d through the coupling 2240 and the launcher arm will be elevated through the gearing from brake 1986 as described in the elevating gear mechanism. The air can be shut off from the motor when desired by moving lever 2247 to its central position.

To depress the launcher arm, lever 2247 will be moved counter-clockwise and valve 2246 will be moved to the right. Ball 2251 will be lifted and check valve 2252 will be opened. Air under pressure from conduit 2245m can now pass through pasage 2245d, through chamber 2245b, past valve 2252, through passage 2245c, into chamber 2245a and around valve 2246 to conduit 2243, to motor 2241. Motor 2241 will now be driven in the opposite direction from that above described and the launcher arm will be depressed. The launcher arm can thus be elevated and depressed by use of the air motor 2241 by moving lever 2247. Spring 2257 will move valve 2246 to the position shown when said valve is free to move. Sleeve 2258 limits the movement of valve 2260 to the left, as seen in the figure.

To train the launcher, as when it is desired to move it clockwise, lever 2261 will be moved clockwise, as indicated by the right-hand arrow in the figure. This will move valve 2260 to the left, raising ball 2263 and opening valve 2265. Air under pressure from conduit 2245n can now pass into passage 2245d, into chamber 2245t, past valve 2265, through passage 2245j, into chamber 2245h, and around valve 2260 to conduit 2245k and to motor 2270. Motor 2270 will now be driven and through the coupling 2275 will drive the worm gear shaft 1943 on the brake 1946 of the training gear mechanism. Air from motor 2270 will pass through conduit 2245m into chamber 2245h at the right of valve 2260 and through exhaust passage 2245o to the atmosphere.

When it is desired to move the launcher in train to the left, lever 2261 will be moved counter-clockwise, as indicated by the arrow at the left in the figure. This will move valve 2260 to the right, lifting ball 2263 and opening valve 2265. Air under pressure can now pass from conduit 2245n into passage 2245d, into chamber 2245e, past valve 2265, through passage 2245j, into chamber 2245h, around valve 2260, and through conduit 2245m, to motor 2270. Motor 2270 will now be driven in the opposite direction from that above described and will drive worm gear shaft 1943 of brake 2276 to move the launcher counter-clockwise. Air from motor 2270 will pass through conduit 2245k, into chamber 2245h, into the enlarged chamber 2245h1 and out through exhaust passage 2245p to the atmosphere. Spring 2272 will move valve 2260 to the position shown when said valve is free to move. Sleeve 2269 will limit the movement of valve 2260 to the right, as seen in the figure.

From the above description it will be seen that should the supply of fluid, such as oil under pressure fail, the launcher can still be operated in elevation and train by the air motors 1988 and 2276 respectively.

What is claimed is:

1. A missile-handling device having in combination, a launcher mechanism having a rotatable member for positioning a missile, means for rotating said member including a shaft, an air motor secured to said shaft for rotating said shaft, a supply of compressed air, a valve means, conduit means having two separate flow paths extending from said valve means to said motor, a second conduit extending from said valve means to said supply, and manually operated means for actuating said valve means to connect either of the flow paths in said conduit means with said second conduit whereby said air motor can be driven in either a clockwise or counter-clockwise direction depending upon the flow path of said conduit means connected with said second conduit.

2. The structure set forth in claim 1 wherein said valve means includes a slide valve for connecting said compressed air supply through said second conduit with either of the two flow paths in said conduit means, said slide valve having a cam surface, a check valve in said second conduit for interrupting the flow path between said compressed air supply and said slide valve, said check valve having a cam follower, said cam follower and said cam being operatively associated, whereby said check valve is opened when said slide valve is positioned so as to connect said second conduit with either of the flow paths in said conduit means and said check valve is closed when said slide valve closes both of the flow paths in said conduit means.

References Cited by the Examiner
UNITED STATES PATENTS

| | | | |
|---|---|---|---|
| 2,316,320 | 4/1943 | Dewandre | 89—41 X |
| 2,411,270 | 11/1946 | Hart et al. | 89—41 |
| 2,434,689 | 1/1948 | Ewart | 89—41 |
| 3,106,132 | 9/1963 | Bierman et al. | 89—1.7 |
| 3,162,170 | 12/1964 | Gondek | 89—45 X |
| 3,169,444 | 2/1965 | Bauer et al. | 89—1.7 |

BENJAMIN A. BORCHELT, *Primary Examiner.*

SAMUEL W. ENGLE, *Examiner.*